United States Patent [19]
Schubach et al.

[11] Patent Number: 5,724,829
[45] Date of Patent: Mar. 10, 1998

[54] CHILLER HEATING ASSEMBLY

[76] Inventors: Frank Schubach; Gary Schubach, both of 1419 N. Thierman Rd., Spokane, Wash. 99212

[21] Appl. No.: 598,393

[22] Filed: Feb. 8, 1996

[51] Int. Cl.⁶ .................................................. F25B 33/00
[52] U.S. Cl. ........................................ 62/497; 122/390
[58] Field of Search ................. 62/476, 497; 122/379, 122/390, 392; 165/95

[56] References Cited

U.S. PATENT DOCUMENTS

| | | | |
|---|---|---|---|
| 705,912 | 7/1902 | Eichelberger | 122/392 |
| 1,801,811 | 4/1931 | Haber | 122/390 |
| 1,843,790 | 2/1932 | Snow et al. | 122/392 |
| 3,323,323 | 6/1967 | Phillips | 62/497 |
| 4,545,411 | 10/1985 | Wierzba | 141/91 |
| 4,570,456 | 2/1986 | Reimann et al. | 62/476 |
| 4,679,620 | 7/1987 | Daun | 165/95 |
| 5,092,280 | 3/1992 | Franklin et al. | 122/379 |
| 5,355,844 | 10/1994 | Kendrick | 122/390 |
| 5,381,674 | 1/1995 | Omori et al. | 62/497 |
| 5,524,454 | 6/1996 | Hollingsworth | 62/497 |

*Primary Examiner*—William Doerrler
*Attorney, Agent, or Firm*—Wells, St. John, Roberts, Gregory & Matkin, P.S.

[57] ABSTRACT

Disclosed is a heating assembly and process for use with a chiller having a generator. A waste oil heater assembly is provided in combination with a source of compressed gas disposed in forced discharge relation to the generator to remove particulates from the generator. A means for controlling the acutuation of the source of compressed gas and an exhaust assembly with a particulate removal container are also disclosed.

18 Claims, 5 Drawing Sheets

CHILLER HEATING ASSEMBLY

TECHNICAL FIELD

The present invention relates to an apparatus and process wherein a chiller receives its source of heat from a waste oil heater assembly.

BACKGROUND OF THE INVENTION

Chillers utilizing an air cooled absorption cooling system are very useful for space cooling needs. Chiller units combined with a heating unit, referred to as a chiller-heater, are also very useful to satisfy part or all of both heating and cooling needs. Examples of such chillers and chiller-heaters are those manufactured and sold under the Servel mark by The Robur Corporation, Evansville, Ind.

As illustrated in FIG. 1, the typical chiller includes a generator 1, a condenser 2 with condenser coils 2a, a refrigerant restrictor 3, an evaporator 4 with evaporator coils 4a, an absorber 5, a solution pump 6, a water pump 7, a source of heat or burner 8 and a heat exchanger 9 attached to the generator. The generator 1 contains a solution of ammonia and water.

FIG. 1 further illustrates water pipe 10 through which return water is piped back to the evaporator for re-cooling, pipe 13 and solution restrictor 12 between the generator 1 and the absorber 5 and pipe 11 through which the ammonia and water solution is pumped by solution pump 6 back to the generator 1.

For thermostatically controlled chillers, when the thermostat calls for the space to be cooled, a source of heat or burner heats the generator 1, causing the ammonia solution in the generator 1 to boil. During the boiling process within the generator 1, the ammonia in solution is separated from the water, leaves the generator 1 and enters the condenser 2, where it is condensed to liquid form. As the liquid ammonia leaves the condenser 2, it passes through a refrigerant restrictor 3, which lowers the pressure as the ammonia enters the evaporator 4.

In the evaporator 4, the liquid ammonia is vaporized to a gaseous state, and during the vaporization, heat is absorbed from the water dripping over the outer surface of the evaporator coil 4a, thereby cooling the water to a predetermined temperature, generally in the forty five degrees fahrenheit range. The chilled water is then pumped to the space where cooling is desired.

The gaseous ammonia from the evaporator 4 then enters the absorber 5 where it is absorbed into water and the ammonia-water solution is then pumped by solution pump 6 back to the generator 1 for re-use.

The generator 1 is an enclosure with a heat exchanger connected to it. An example of such a generator and annular fin heat exchanger combination is shown in FIG. 2, which illustrates a cylindrically shaped generator 1 with annular fins 15 about its circumference. The annular fins 15 each have a top surface 15a.

The sources of heat used to boil the ammonia-water solution in the generator have heretofore been natural gas or propane fired burners, which burn very clean.

With the world's high annual consumption of oil of all types and the environmental disposal problems associated therewith, there is a need for applications of waste oil heater assemblies to utilize waste oil instead of disposing of it in less desirable ways. However, because the specific properties of, and contaminants within, waste oil may vary greatly, even the most efficient waste oil heater assemblies have appreciably more contaminants in the products of combustion than do gas burners.

Waste oil heater assemblies have not been widely utilized in applications in combinations with heat transfer surfaces which must be maintained very clean because the products of combustion tend to build up on and contaminate the surfaces. This is especially true with heat exchangers which utilize such heat transfer means as annular fins and the like, such as those used in chillers and illustrated in FIG. 2.

Until this invention, waste oil heater assemblies were not generally regarded as usable as the source of heat for generators in chillers because of the need to maintain a very clean heat transfer surface connected to the generator. In chiller and chiller-heater systems, there is minimal tolerance for the loss or degradation in the transfer of heat to the generator such that if any appreciable buildup of soot or other products of combustion occurs on the heat exchanger, the chiller will not work properly. Due to these factors, natural gas fired burners have heretofore been used as the source of heat for chillers and waste oil heater assemblies have not been generally used.

Prior attempts to merely combine existing waste oil heater assembly systems with chiller or chiller-heater systems to provide a source of heat to the generator have resulted in unacceptably high rates of contamination and residue buildup on the heat exchanger for the generator, thereby causing an unacceptable loss in heat transfer to the generator.

The need to provide an effective and reliable means to utilize waste oil heater assemblies for chillers has been recognized, but has not been adequately fulfilled by prior known machinery, methods, or combinations. A further need has been recognized for such waste oil fired chillers and chiller-heaters which are relatively simple and economical in design but which still provide reliable and continued maintenance operation of the chiller.

The present invention addresses the problems associated with combining waste oil heater assemblies with chillers and chiller-heaters, particularly those problems related to effective heat transfer and avoiding residue build up on the heat exchanger of the generator.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Many of the fastening, connection, process and other means and components utilized in this invention are widely known and used in the field of the invention described, and their exact nature or type is not necessary for an understanding and use of the invention by a person skilled in the art or science, and they will not therefore be discussed in significant detail. Furthermore, the various components shown or described herein for any specific application of this invention can be varied or altered as anticipated by this invention and the practice of a specific application of any element may already be widely known or used in the art or by persons skilled in the art or science and each will not therefore be discussed in significant detail.

Figure 1:
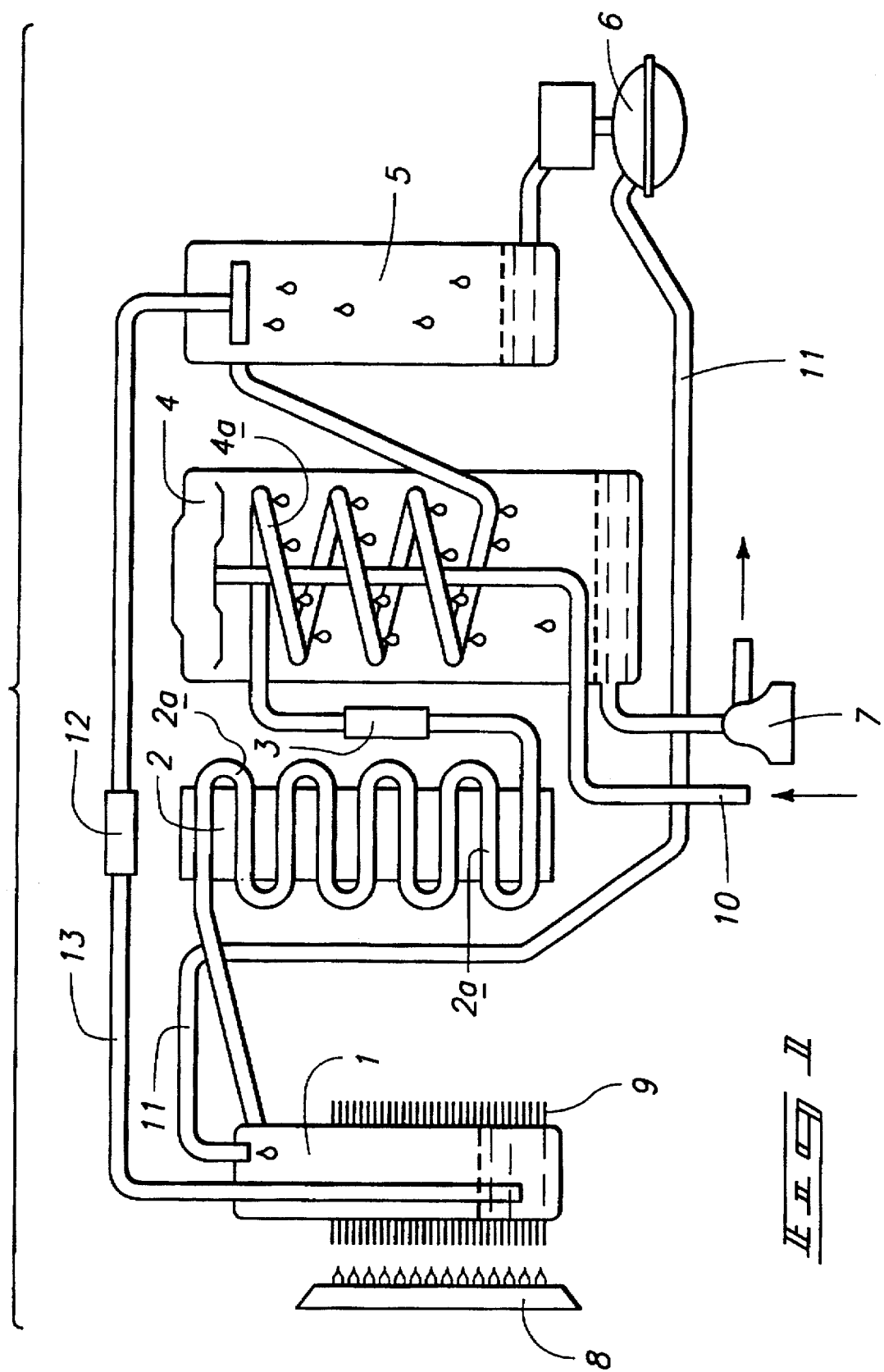
FIG. 1 is a schematic of a chiller.
Figure 2:
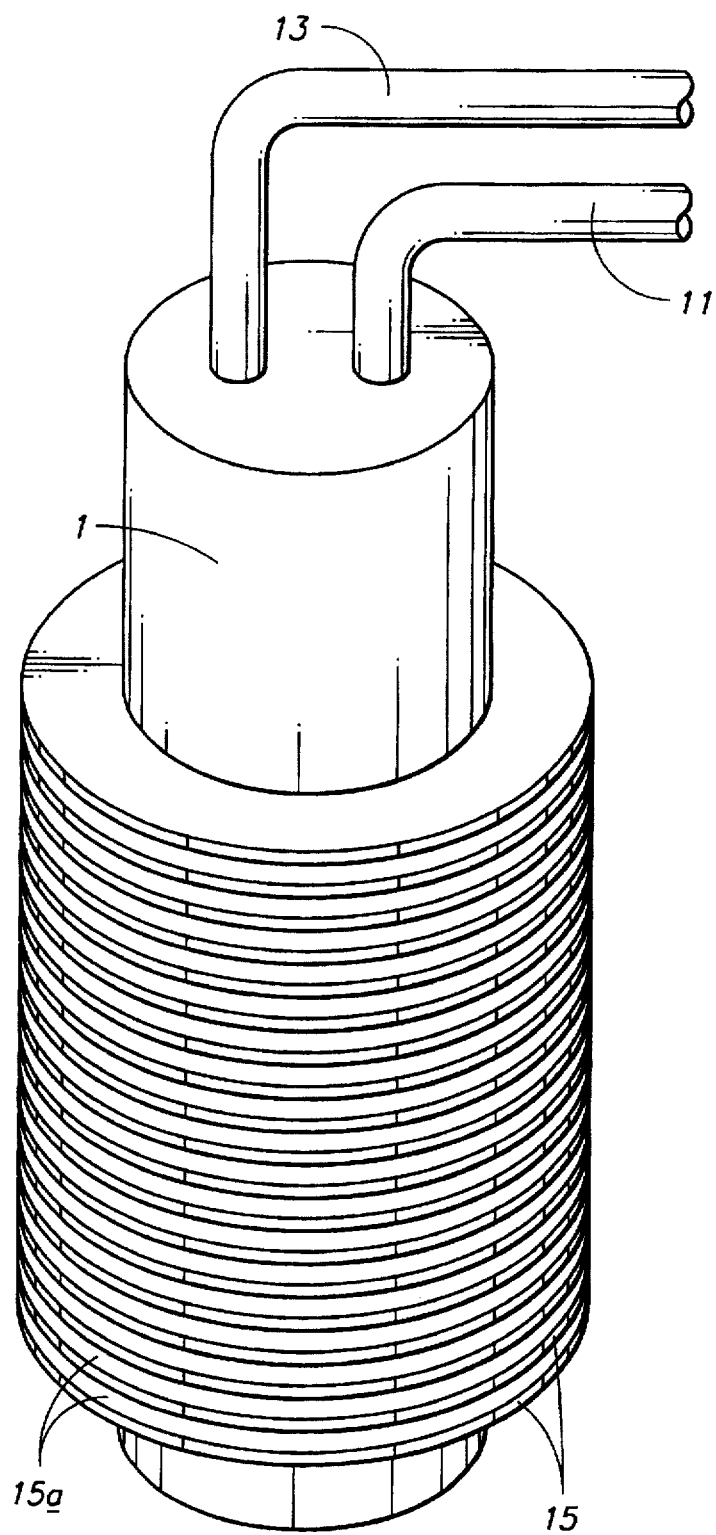
FIG. 2 is a perspective view of a typical generator with an annular fin heat exchanger surrounding it.

As explained in the Background of the Invention, a typical chiller is shown in FIG. 1. If waste oil heater assemblies were simply combined with the existing chillers, the heat transfer surfaces shown in FIG. 2 would soon become built up with ash, residue and other particulates, thereby degrading the heat transfer and unacceptably altering the performance of the chiller.

Figure 3:
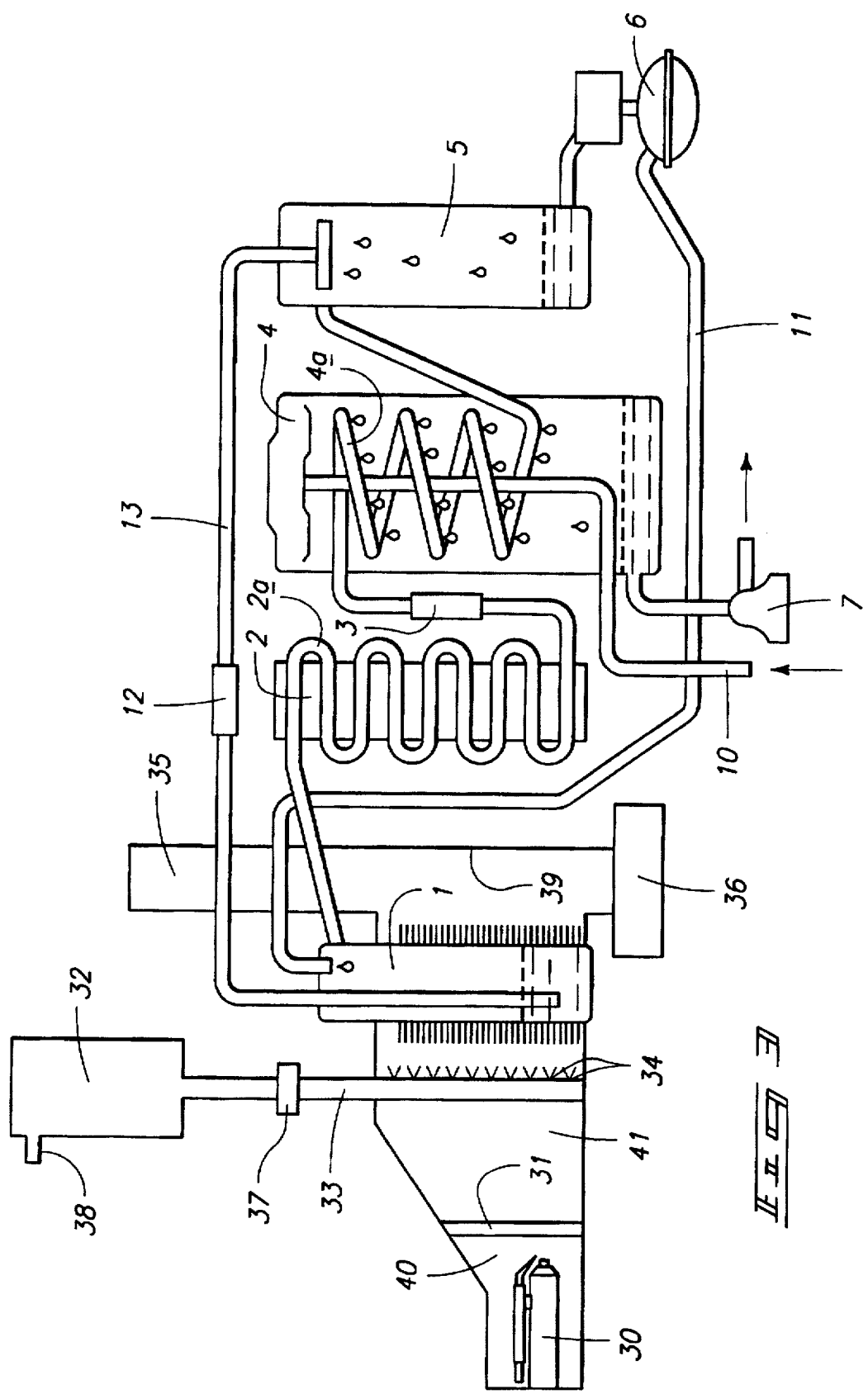
FIG. 3 is an elevation view of a chiller with the components of the invention illustrated thereon.

FIG. 3 illustrates the components of this invention which overcome these problems, including a waste oil heater assembly 30, a combustion chamber 40, a grate 31, a plenum 41, a compressed air tank 32 which receives compressed air from a source of compressed air through air pipe 38, an air manifold 33 which includes a plurality of air holes 34 in the air manifold 33 and an air valve 37 in the air manifold 33 between the air holes 34 and the air tank 32.

The waste oil heater assembly 30 generally receives the waste oil from an oil storage tank, preheats the waste oil and atomizes it through a nozzle. The flow of atomized waste oil from the nozzle is typically ignited by electrode positioned near the nozzle, thereby causing a flame and generating the heat. Forced convection can be used to maintain and direct the flow of the products of combustion.

The plenum 41 is a continuation of the combustion chamber 40 and facilitates, contains and directs the movement of the hot products of combustion to the heat exchanger on the generator 1.

The grate 31 is nine gauge interwoven wire in a grid arrangement with one-quarter inch openings. The air tank 32 is an eight gallon tank and air pipe 38 is one inch interior diameter piping.

Although compressed air is used due to its availability and cost, any other gases could likewise be used within the contemplation of this invention.

The system includes a means for controlling the actuation of the source compressed air, the preferred embodiment of which includes a solenoid, set to actuate an air valve 37 at pre-determined time intervals, operates the air valve 37 thereby causing it to open and release the compressed air through the air holes 34 and over the heat transfer surface on the generator 1. The operation of the air valve every ten minutes is currently the preferred time interval to maintain the heat transfer surface on the generator sufficiently clean. The solenoid causes the value to open for approximately two seconds.

The blast of air removes the soot and residue from the heat transfer surface, which is then blown against exhaust assembly wall 39, where it drops into particulate removal container 36. The other products of combustion, which are at elevated temperatures, flow through exhaust assembly 35 and are thereby discharged.

Examples of waste oil heater assemblies and systems which can be utilized in combination with the chiller are disclosed in U.S. Pat. No. 4,797,089 and 4,877,395, issued to the inventors herein, and are incorporated herein by reference.

An existing chiller which can be used in combination with the waste oil heater system described herein is one manufactured by The Robur Corporation, Evansville, Ind., under its service mark "Servel", referred to as its AYB, AYC and AYD Series Chiller-Heaters.

Figure 4:
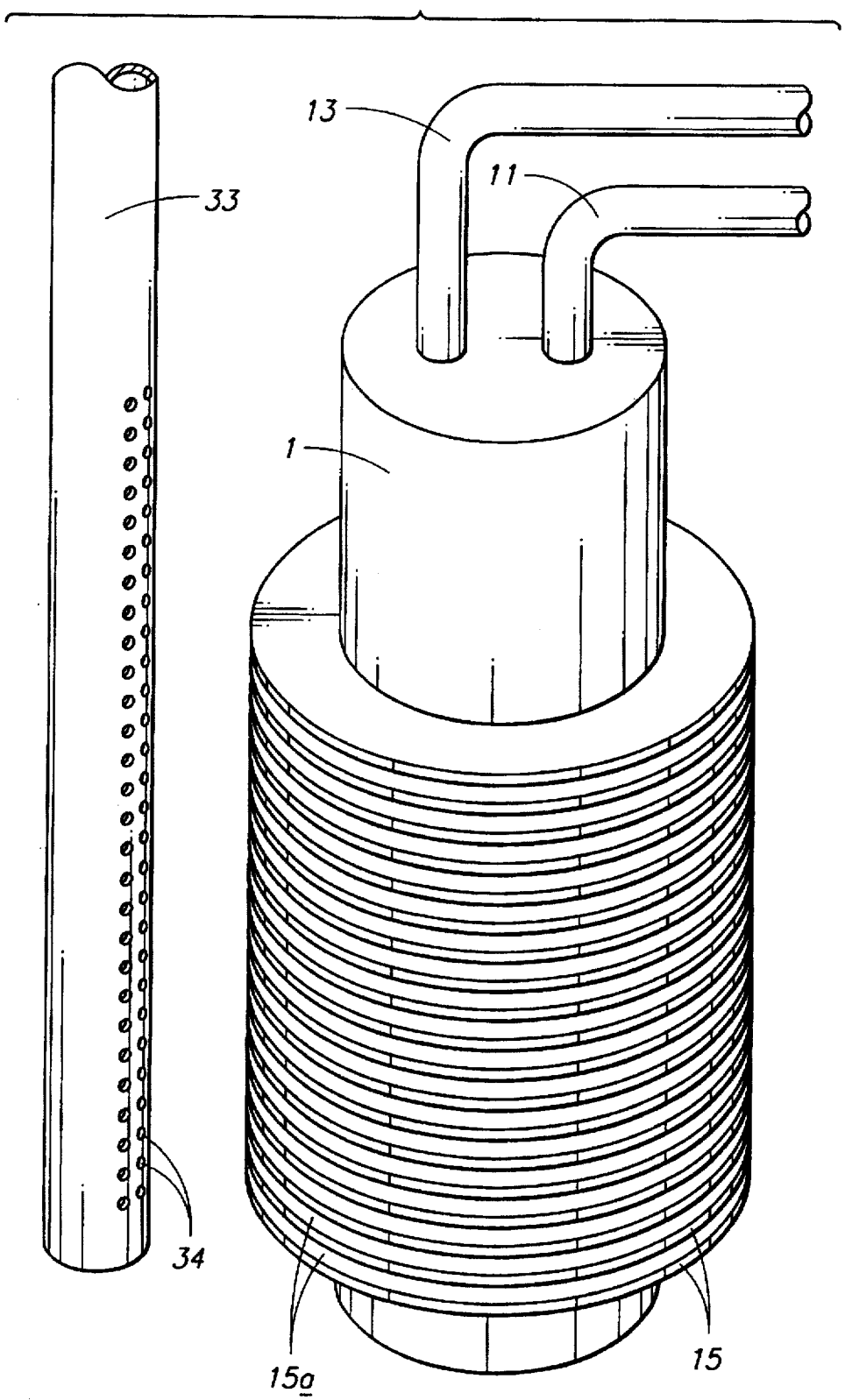
FIG. 4 is a perspective view of the gas manifold positioned relative to the heat exchanger on the generator.

FIG. 4 is a perspective view of the air manifold 33 and air holes 34 therein, relative to the heat transfer surface of the generator 1. As the air is released by the air valve 37 and through the air holes 34 in the air manifold 33, the holes are arranged such that the air is blasted over much of the heat transfer surface of the generator. Typical air pressure for the compressed air that is effective for this invention is one hundred forty pounds per square inch.

Although the air manifold 33 is shown in FIG. 4 located between the waste oil heater assembly 30 and the generator 1, it can also be located in other locations relative to the generator, such as in the exhaust assembly 35. However, placing the air manifold 33 in other locations may complicate the particulate removal, the flow of the products of combustion and the operation of the exhaust assembly 35.

The air manifold 33 located in the vicinity of the heat transfer surface of the generator 1 is also believed to act as a heat sink and believed to transfer radiant heat to the generator 1.

The soot, ash and other particulates which accumulate in particulate removal container 36 can easily be disposed of as needed.

Figure 5:
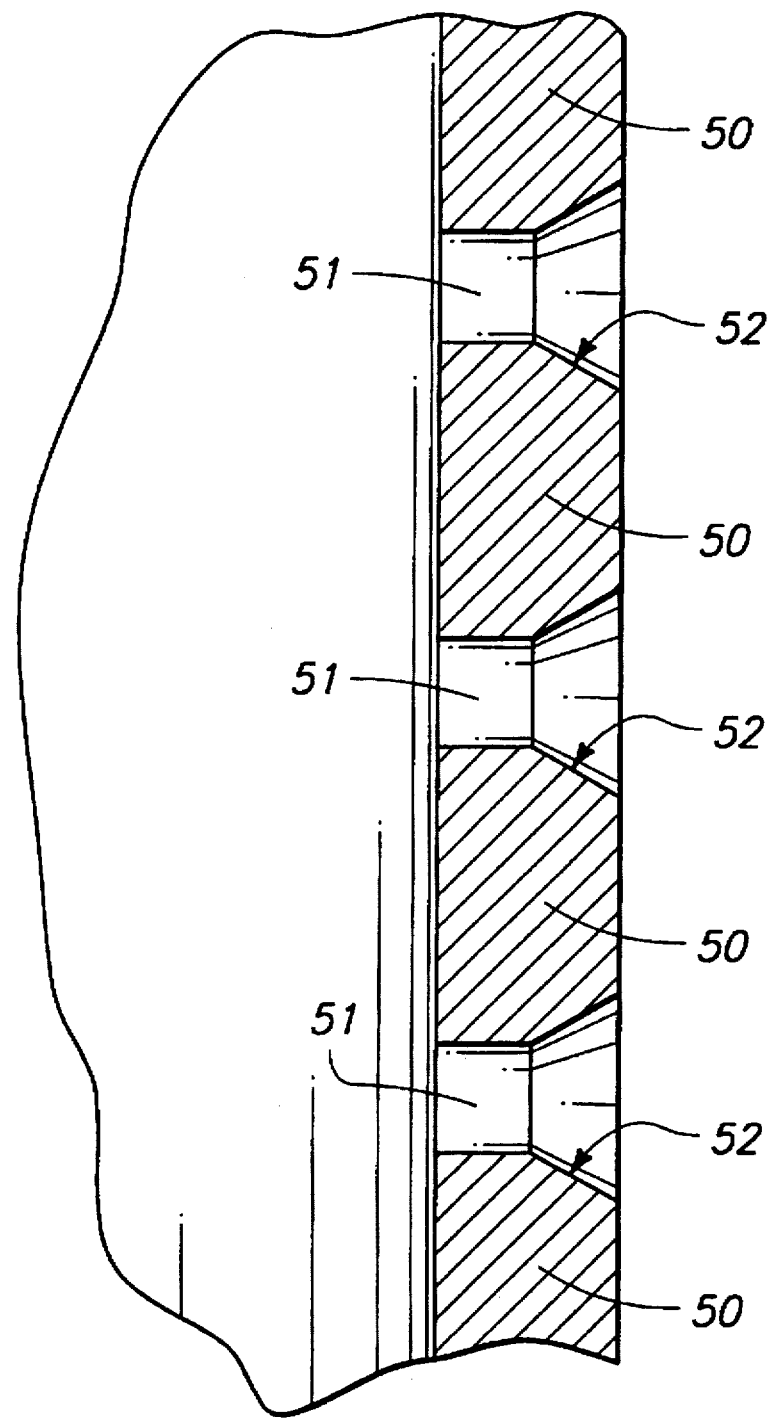
FIG. 5 is a cross section of a gas hole in the gas manifold wall.

FIG. 5 is a cross-section of the air manifold wall 50 illustrating the air holes 34. The air holes 34 are made by drilling through the wall with a smaller diameter drill bit resulting in smaller hole portion 51 with a constant diameter, and then using the end of a larger diameter drill bit partially through the air manifold wall 50 to create a truncated hole portion 52. The combination of the smaller hole portion 51 and the truncated hole portion 52 of the air hole 34 is believed to create a better dispersion of the air over the heat exchanger of the generator 1. The air manifold wall 50 is preferably constructed of high heat resistant stainless steel.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A heating assembly for use with a generator, comprising:

a. a waste oil heater assembly which produces particulate matter suspended in a gas in forced convection relation to a generator and which become deposited on the exterior of the generator;

b. a source of compressed gas disposed in forced discharge relation to the generator to remove the particulate matter from the generator.

2. A heating assembly for use with a generator as recited in claim 1, and in which further comprises a means for controlling the actuation of the source of compressed gas.

3. A heating assembly for use with a generator as recited in claim 1, and which further comprises an exhaust assembly disposed downstream relative to the generator.

4. A heating assembly for use with a generator as recited in claim 3, and in which the exhaust assembly further comprises an exhaust stack.

5. A heating assembly for use with a generator as recited in claim 3, and in which the exhaust assembly further comprises a particulate removal assembly.

6. A heating assembly for use with a chiller having a generator, comprising:
   a. a waste oil heater assembly oriented in heat discharging relative relation to the generator and which produces particulate matter suspended in a gas in forced convection relation to the generator and which becomes deposited on the exterior of the generator;
   b. a source of compressed gas disposed in forced discharge relation to the generator and located downstream relative to the waste oil heater assembly to remove the particulate matter from the generator;
   c. a means for controlling the actuation of the source of compressed gas; and
   d. an exhaust assembly disposed downstream relative to the generator.

7. A heating assembly for use with a generator as recited in claim 6, and in which the exhaust assembly further comprises an exhaust stack.

8. A heating assembly for use with a generator as recited in claim 6, and in which the exhaust assembly further comprises a particulate removal assembly.

9. A heating assembly for use with a generator as recited in claim 6, and which further comprises a heat exchanger assembly operatively connected to the generator, which receives heat and particulates discharged by the heating assembly and which receives the forced discharge of the source of compressed gas.

10. A chiller which includes a generator and which utilizes a waste oil heater assembly as its source of heat, comprised of:
    a. a waste oil heater assembly oriented in heat discharging relative relation to the generator and which produces particulate matter suspended in a gas in forced convection relation to the generator and which becomes deposited on the exterior of the generator; and
    b. a source of compressed gas disposed in forced discharge relation to the generator and located downstream relative to the waste oil heater assembly.

11. A chiller which includes a generator and which utilizes a waste oil heater assembly as its source of heat, as recited in claim 11, and which is further comprised of a means for controlling the actuation of the source of compressed gas.

12. A chiller which includes a generator and which utilizes a waste oil heater assembly as its source of heat, as recited in claim 11, and in which the means for controlling the actuation of the source of compressed gas is comprised of a solenoid set to actuate a gas valve and thereby release the compressed gas at pre-determined time intervals.

13. A chiller which includes a generator and which utilizes a waste oil heater assembly as its source of heat, as recited in claim 11, and which is further comprised of an exhaust assembly disposed downstream relative to the generator.

14. A heating assembly for use with a generator as recited in claim 13, and in which the exhaust assembly further comprises an exhaust stack.

15. A heating assembly for use with a generator as recited in claim 13, and in which the exhaust assembly further comprises a particulate removal assembly.

16. A heating assembly for use with a generator as recited in claim 13, and which further comprises a heat exchanger assembly operatively connected to the generator, which receives heat and particulates discharged by the heating assembly and which receives the forced discharge of the source of compressed gas.

17. A waste oil heater assembly fired chiller as recited in claim 1, and which further comprises a combustion chamber enclosure in which the waste oil heater assembly is positioned.

18. A process for utilizing a waste oil heater assembly as a source of heat for a chiller which includes a generator, comprising:
    a. providing a chiller which includes a generator;
    b. providing a waste oil heater assembly oriented in heat discharging relative relation to the generator and which produces particulate matter suspended in a gas in forced convection relation to the generator and which becomes deposited on the exterior of the generator;
    c. providing a source of compressed gas disposed in forced discharge relation to the generator and located downstream relative to the waste oil heater to remove the particulate matter from the generator; and
    d. periodically actuating the release of the compressed gas to remove particulates on the generator.

* * * * *